United States Patent
Kubota

[11] Patent Number: 5,270,137
[45] Date of Patent: Dec. 14, 1993

[54] SECONDARY BATTERY WITH GRAFT-POLYMERIZED SEPARATOR

[75] Inventor: Tadahiko Kubota, Kanagawa, Japan

[73] Assignee: Fuji Photo Film Co., Ltd., Kanagawa, Japan

[21] Appl. No.: 944,986

[22] Filed: Sep. 15, 1992

[30] Foreign Application Priority Data

Sep. 18, 1991 [JP] Japan .................. 3-265475

[51] Int. Cl.$^5$ .......................... H01M 2/16
[52] U.S. Cl. ................................. 429/249
[58] Field of Search ............ 429/249, 247; 427/58, 427/322

[56] References Cited

U.S. PATENT DOCUMENTS 4,168,352 9/1979 Dick et al. ............... 429/249 X
4,234,623 11/1980 Moshtev et al. ............ 429/249 X

FOREIGN PATENT DOCUMENTS 5384134 7/1978 Japan .
6217822 4/1987 Japan .

OTHER PUBLICATIONS

Journal of Power Sources, 9 (1983) pp. 101–135.

Primary Examiner—Anthony Skapars
Attorney, Agent, or Firm—Sughrue, Mion, Zinn, Macpeak & Seas

[57] ABSTRACT

A secondary battery comprising a positive-electrode active material enabling the battery to discharge and to be charged, an electrolyte solution, a separator, and a negative-electrode active material enabling the battery to discharge and to be charged, wherein the separator is obtained by subjecting a porous polymer substrate to plasma treatment and polymerizing a monomer in the presence of the plasma-treated substrate thereby to graft-polymerize the monomer onto the substrate.

3 Claims, 1 Drawing Sheet

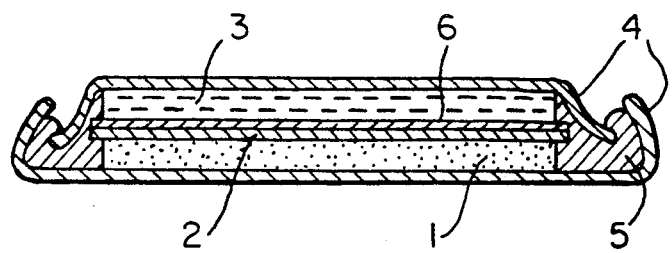

SECONDARY BATTERY WITH GRAFT-POLYMERIZED SEPARATOR

FIELD OF THE INVENTION

The present invention relates to a secondary battery.

BACKGROUND OF THE INVENTION

As separators for secondary batteries including lithium secondary batteries, porous polymer films have been used hitherto which have excellent permeability to electrolyte solutions. However, due to the porous nature of such a porous polymer film separator, use thereof as the separator in a secondary battery has inevitably had a practical problem that as the battery is repeatedly charged and discharged, dendrites grow and penetrate through pores of the porous film to cause a short-circuit or the dendrites fall from the electrode to cause a decrease in capacity.

JP-A-53-84134 discloses a separator for secondary batteries, such as lithium secondary batteries, which is obtained by grafting an electrolyte solution-permeable polymer onto a porous substrate thereby to fill the pores of the substrate with the polymer. (The term "JP-A" as used herein means an "unexamined published Japanese patent application".) However, this separator film is not suited for practical use because it swells too much. Although a measure for controlling the swelling of the film is disclosed in JP-B-62-17822, this technique has failed to provide a substantial solution to the swelling problem. (The term "JP-B", as used herein, means an "examined Japanese patent publication".)

JP-A-2-82457 discloses a method of producing a separator which comprises impregnating a porous resin film with a monomer and then irradiating the resulting film with ultraviolet rays to polymerize the monomer, thereby to fill the pores of the film with the polymer. However, this method has a drawback that the adhesion between the porous resin and the polymer is so poor that the separator develops voids at the interface between the porous resin and the polymer. Thus, this method has been unable to solve the problem of dendritic growth.

Further, JP-A-3-41107 discloses a separator modification utilizing plasma-initiated polymerization. In general, plasma-initiated polymerization is a technique of polymerizing a gaseous-phase or liquid-phase monomer by irradiating the monomer with a plasma (as described in "Plasma Polymerization" written by Yoshihito Osada et al., published by Tokyo Kagaku Dohjin, Japan). This method, however, has also failed to improve the adhesion between the polymer substrate and the polymer formed by plasma polymerization to a desired level. In addition, even in the case where the polymerization of a monomer was conducted by irradiating a substrate with a plasma to graft-polymerize the monomer onto the substrate, the thus-obtained separator was unable to sufficiently inhibit dendritic growth.

SUMMARY OF THE INVENTION

A first object of the present invention is to prevent dendritic growth.

A second object of the present invention is to provide a secondary battery which, when charged and discharged repeatedly, suffers only a slight decrease in capacity.

A third object of the present invention is to provide a secondary battery using a battery separator having excellent dimensional stability.

A fourth object of the present invention is to provide a secondary battery using a battery separator which comprises a porous substrate and a polymer which virtually fills all the pores of the substrate, and in which the adhesion of the polymer to the substrate is excellent.

The above and other objects of the present invention are accomplished with a secondary battery comprising a positive-electrode active material enabling the battery to discharge and to be charged, an electrolyte solution, a separator, and a negative-electrode active material enabling the battery to discharge and to be charged, wherein the separator is obtained by subjecting a porous polymer substrate to plasma treatment and polymerizing a monomer in the presence of the plasma-treated substrate thereby to graft-polymerize the monomer onto the substrate.

BRIEF DESCRIPTION OF THE DRAWING

FIG. 1 is a sectional view illustrating the construction of the coin-type batteries fabricated in Examples 1 to 10 and Comparative Examples 1 to 4.

DETAILED DESCRIPTION OF THE INVENTION

The porous substrate to be irradiated with plasma in order to produce the separator employed in the battery of the present invention may be made of a polymer such as a polyolefin, poly(vinyl halide), polyester, polyamide, polysulfone, cellulose, polyurethane, or the like. Preferred examples of the substrate polymer include polyethylene, polypropylene, polybutene, polyisobutylene, ethylene-propylene copolymers, poly(vinyl chloride), poly(1,1-dichloroethylene), poly(chlorotrifluoroethylene), poly(1,1-dichloro-2-fluoroethylene), poly(1,2-dichloro-1,2-difluoroethylene), poly(1,1-difluoroethylene), poly-(1,2-difluoroethylene), polytetrafluoroethylene, poly[(pentafluoroethyl)ethylene], polyhexafluoropropylene, poly(3,3,3-trifluoropropylene), poly(vinyl fluoride), poly(ethylene terephthalate), poly(butylene terephthalate), poly(ethylene adipate), poly(oxy-2,2,3,3,4,4-hexafluoropentamethyleneoxyadipoyl), poly(oxytetraphthaloyloxy-1,4-phenyleneisopropylidene-1,4-phenylene), poly(oxytetramethyleneoxyterephthaloyl), nylon 3, nylon 6,6, nylon 4,6, nylon 5,6, nylon 6, nylon 6,2, nylon 11, poly-(oxy-1,4-phenylenesulfonyl-1,4-phenylene), poly(oxy-1,4-phenylenesulfonyl-1,4-phenyleneoxy-1,4-phenylenemethylene 1,4-phenylene), carboxymethyl cellulose, hydroxyethyl cellulose, triacetoxy cellulose, diacetoxy cellulose, and poly(oxytetramethyleneoxycarbonyliminohexaethyleneiminocarbonyl). Of these, polyethylene, polypropylene, ethylene-propylene copolymers, and polytetrafluoroethylene are particularly preferred.

For use in producing the separator to be employed in the battery of the present invention, it is preferable if the porous polymer substrate has a porosity of from 30 to 90%, with the more preferred range of the porosity thereof being from 40 to 90%.

Further, the maximum pore diameter of the porous polymer substrate is preferably from 0.01 to 50 μm, more preferably from 0.01 to 20 μm, and most preferably from 0.01 to 5 μm.

As the monomer for use in producing the separator to be employed in the battery of the present invention, any vinyl compound may be used as long as the compound is polymerizable. It is, however, preferred that the monomer contain a group capable of dissolving in the electrolyte solution to be employed in the battery of the present invention. The group capable of dissolving in the electrolyte solution may be anionic, nonionic, or cationic. Preferred examples of such a group include ethylene oxide groups, propylene oxide groups, ester groups, carbonyl groups, amide groups, amino groups, nitrile groups, alkyl groups, phenyl groups, sulfonic acid groups, phosphoric acid groups, and carboxylic acid groups.

Preferred examples of the monomer to be used for producing the separator include compounds represented by general formulae (1), (2), and (3), alone or in combination thereof, described below.

General Formula (1):

$$CH_2=\underset{R_2}{\overset{R_1}{C}}$$

In general formula (1), $R_1$ represents a hydrogen atom or an alkyl group having from 1 to 3 carbon atoms, and preferably is a hydrogen atom or a methyl group. $R_2$ represents $-C(O)-X_1-(CH_2CH_2O)_n-R_3$, $-C(O)-Y-(CH_2)_x-C_6H_5$, or $-CN$, in which $X_1$ and Y represent an oxygen atom or $-N(R_4)-$, in which $R_4$ represents a hydrogen atom or an alkyl group having from 1 to 3 carbon atoms. $X_1$ preferably is an oxygen atom, $-N(CH_3)-$, or $-N(C_2H_5)-$. n is an integer preferably from 0 to 50, more preferably from 0 to 23, and most preferably from 0 to 9. $R_3$ represents a hydrogen atom, an alkyl group having from 1 to 3 carbon atoms, an aralkyl group, or an aryl group having from 6 to 14 carbon atoms, preferably, a hydrogen atom, an alkyl group having 1 or 2 carbon atoms, an aralkyl group having from 7 to 10 carbon atoms, or $-C_6H_5$, and more preferably, a hydrogen atom, a methyl group, or $C_6H_5$ group. x is an integer preferably from 1 to 5, and more preferably, from 1 to 3.

Examples of $R_2$ include $-C(O)O(CH_2CH_2O)_nCH_3$, $-C(O)O(CH_2CH_2O)_n-C_6H_5$, $-C(O)OCH_2C_6H_5$, $-C(O)OC_6H_5$, $-C(O)CH_3$, $-C(O)OC_2H_5$, $-C(O)OC_3H_7$, $-C(O)NH_2$, $-C(O)N(CH_3)_2$, and $-CN$.

General Formula (2):

$$CH_2=\underset{R_5}{C}-X_1-\underset{R_5}{C}=CH_2$$

In general formula (2), $R_5$ represents a hydrogen atom or an alkyl group having from 1 to 3 carbon atoms, and preferably is a hydrogen atom or a methyl group. $X_2$ represents $-C(O)-X_3-C(O)-$, in which $X_3$ represents $-O-X_4-O-$ or $-O-(CH_2CH_2O)_m-$. $X_4$ is an alkylene group, preferably one having from 1 to 20 carbon atoms, more preferably, one having from 1 to 10 carbon atoms, and most preferably, one having from 1 to 6 carbon atoms.

m is an integer of 1 or more, preferably from 1 to 50, more preferably from 1 to 20, and most preferably from 1 to 10.

Examples of $X_2$ include $-C(O)-O-(CH_2CH_2O)_m-C(O)-$, $-C(O)-O-(CH_2)_6-O-C(O)-$, $-C(O)O-CH(CH_3)-CH_2CH_2OC(O)-$, and $-C(O)O-CH_2C(CH_3)_2CH_2OC(O)-$.

General Formula (3):

$$(CH_2=\underset{R_6}{C}-C(O)-O-CH_2)_3C-R_7$$

In general formula (3), $R_6$ represents a hydrogen atom or an alkyl group having from 1 to 3 carbon atoms, and preferably is a hydrogen atom or a methyl group. $R_7$ represents an alkyl group or a group having the formula $-CH_2O-R_8$, in which $R_8$ represents a hydrogen atom or an alkyl group having from 1 to 10, preferably 1 to 5, more preferably 1 to 3 carbon atoms. Preferred examples of $R_7$ include alkyl groups having from 1 to 10 carbon atoms, $-CH_2OH$, $-CH_2OCH_3$, and $-CH_2OCH_2CH_3$. More preferred examples of $R_7$ are alkyl groups having from 1 to 3 carbon atoms, $-CH_2OH$, $-CH_2OCH_3$, and $-CH_2OCH_2CH_3$.

Specific examples of compounds of general formula (1) are given below, but the compound is not, of course, limited to these examples.

| | |
|---|---|
| $CH_2=\underset{CO_2(CH_2CH_2O)_nCH_3}{CCH_3}$ $(n=1)$ | 1-1 |
| the same compound as 1-1 except that $n=4$ | 1-2 |
| the same compound as 1-1 except that $n=9$ | 1-3 |
| the same compound as 1-1 except that $n=23$ | 1-4 |
| $CH_2=\underset{CO_2-CH_2CH_2O)_nCH_3}{CCH_3}$ $(n=1)$ | 1-5 |
| the same compound as 1-5 except that $n=4$ | 1-6 |
| the same compound as 1-5 except that $n=9$ | 1-7 |
| $CH_2=\underset{CO_2-(CH_2CH_2O)_n-C_6H_5}{C-CH_3}$ $(n=1)$ | 1-8 |
| the same compound as 1-8 except that $n=3$ | 1-9 |
| $CH_2=\underset{CO_2(CH_2CH_2O)_nC_6H_5}{CH}$ | 1-10 |
| $CH_2=\underset{CO_2CH_2C_6H_5}{CCH_3}$ | 1-11 |
| $CH_2=\underset{CO_2CH_2C_6H_5}{CH}$ | 1-12 |
| $CH_2=\underset{CO_2OC_6H_5}{CCH_3}$ | 1-13 |
| $CH_2=\underset{CO_2CH_3}{CCH_3}$ | 1-14 |
| $CH_2=\underset{CO_2CH_3}{CH}$ | 1-15 |
| $CH_2=\underset{CO_2CH_2CH_3}{CCH_3}$ | 1-16 |

-continued

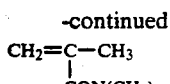   1-17

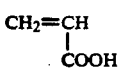   1-18

Specific examples of compounds of general formula (2) are given below, but the compounds are not, of course, limited to these examples.

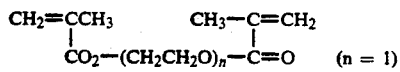   2-1 the same compound as 2-1 except that n = 2   2-2 the same compound as 2-1 except that n = 4   2-3 the same compound as 2-1 except that n = 9   2-4

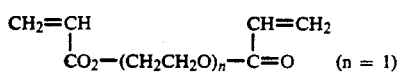   2-5 the same compound as 2-5 except that n = 2   2-6 the same compound as 2-5 except that n = 4   2-7 the same compound as 2-5 except that n = 9   2-8

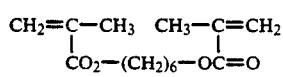   2-9

   2-10

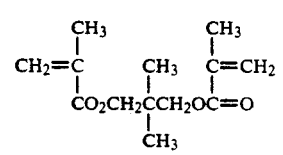   2-11

Specific examples of compounds of general formula (3) are given below, but compounds are not, of course, limited to these examples.

   3-1

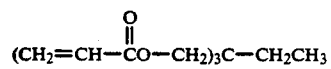   3-2

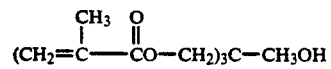   3-3

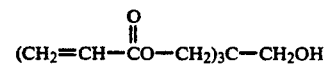   3-4

In conducting polymerization, any one of the compounds of general formulae (1), (2), and (3) may be polymerized alone, or two or more of these compounds may be polymerized in combination with one another in an arbitrary proportion.

Water or an organic solvent, preferably water, may be used as a reaction medium for the polymerization.

In the case where water is used as a reaction medium to polymerize a hydrophobic monomer, it is preferred to use a surfactant so that the polymerization is conducted while the monomer is kept in a dispersed or emulsified state.

The process for the plasma treatment and polymerization for producing a separator is explained below. The polymerization of the monomer is conducted while a porous polymer substrate, which has undergone plasma surface treatment, is immersed in a solution or dispersion of the monomer. Although the product of the polymerization of the monomer may contain a non-graft-portion in the polymer substrate, it is preferable for the polymerization product to contain a grafted polymer.

Each step of the process is explained below.

The plasma surface treatment for activating the surfaces of the porous polymer substrate may be conducted by using ordinary discharge treatment. Details of the discharge plasma treatment are given, for example, in J. R. Hollahan and A. T. Bell, *Techniques and Applications of Plasma Chemistry*, Wiley, New York, 1974 and in other books and publications.

Reactions of high-energy active particles, such as radicals and ions, generated in a discharge plasma take place within an extremely thin surface layer of the polymer substrate and, as a result, C—C bonds or C—H bonds in the molecules of the polymer are cleaved and polymeric radicals are formed. These reactions are followed by reactions between radicals and elimination reactions, thereby to form crosslinks and unsaturated bonds. In some cases, polar groups are newly introduced through reactions with an active gas such as oxygen.

On the other hand, polymeric radicals which have not undergone the above reactions, which are secondary reactions, can take part in graft polymerization when brought into contact with the monomer. In other words, the polymeric radicals can be utilized as graft polymerization-initiating sites.

In producing a discharge plasma, audio-frequency waves having a frequency on the order of from several kilohertz (kHz) to several tens of kHz, radio-frequency waves having a frequency of 13.56 MHz, or microwaves having a frequency on the order of GHz may be utilized.

For producing a separator to be employed in the present invention, high-voltage discharge for the plasma treatment is generally conducted under a reduced pressure, preferably at any of various gas pressures higher than 0.001 Torr and lower than 20 Torr. For example, it is more preferred to conduct the plasma surface treatment by irradiating the polymer substrate with a plasma for a period of from 5 seconds to 10 minutes under conditions of a gas pressure of from 0.01 to 1.0 Torr and an output of from 5 to 500 W.

As a plasma gas source, use may be made of a gas which does not deteriorate the substrate polymer, such as a noble gas (e.g., helium or argon), nitrogen, or a residual inorganic gas.

The step of grafting a monomer onto the plasma-treated polymer substrate is now explained. This graft polymerization can be carried out in various ways, which are generally divided into two methods: (1) a method in which the polymer substrate already activated with plasma is directly treated with a degassed monomer solution to allow the polymer to react with the monomer; and, (2) a method in which the activated polymer substrate is first brought into contact with air or oxygen gas to form peroxides, the peroxides are subsequently pyrolyzed to oxy-radicals, and the resulting polymer substrate is then treated with a degassed monomer solution to allow the polymer to react with the monomer. Both of these two methods are usable for producing a separator to be employed in the battery of the present invention.

It is generally desirable for the graft polymerization reaction to be carried out in vacuo (e.g., under a high vacuum). However, it is possible to conduct the polymerization at a higher pressure (e.g., ordinary pressure) in the absence of air or oxygen, for example, in a nitrogen or argon gas atmosphere.

The temperature for the graft polymerization varies depending on the polymerization activity of the monomer employed. In general, however, the graft polymerization may be conducted at a temperature of from 0° to 100° C., preferably, from room temperature to 90° C.

The reaction time for the graft polymerization is not particularly limited, but a practically preferred range thereof is from 10 minutes to 10 hours.

When the film thus obtained by the above-described process is used as the separator for the battery in this invention, the thus-obtained separator may be impregnated with an electrolyte solution containing a supporting electrolyte dissolved therein.

As the supporting electrolyte, a salt of a Group Ia or IIa element of the periodic table is used. Examples of these salts include $LiBF_4$, $LiClO_4$, $LiCF_3SO_3$, $LiPF_6$, lithium toluenesulfonate, $NaClO_4$, $NaBF_4$, NaCl, LiCl, LiOH, and NaOH. These may be used alone or in combination of two or more thereof.

The solvent for the supporting electrolyte is not particularly limited as long as it dissolves the electrolyte therein. Examples of the solvent include propylene carbonate, butylene carbonate, ethylene carbonate, γ-butyrolactone, dimethoxyethane, tetrahydrofuran, methyltetrahydrofuran, acetonitrile, 1,3-dioxolane, nitromethane, dimethylformamide, dimethyl sulfoxide, and water. These may be used alone or in combination of two or more thereof.

There is no particular limitation on the concentration of the supporting electrolyte in the solution in which the separator is impregnated. However, the electrolyte solution generally has a supporting electrolyte concentration such that the separator film after impregnation has an ionic conductance of preferably $10^{-9}$ S/cm or higher, more preferably $10^{-6}$ S/cm or higher, most preferably $10^{-4}$ S/cm or higher.

Examples of the positive-electrode active material for use with the separator in the battery of the present invention include oxides, sulfides, and selenides of manganese, molybdenum, vanadium, titanium, chromium, niobium, cobalt, and nickel, active carbon (described in JP-A-60-167280), carbon fibers (described in JP-A-61-10882), polyaniline, polymers of amino group-substituted aromatic compounds, polymers of heterocyclic compounds, polyacene, and polyyne compounds. Particularly useful are active carbon, γ-$MnO_2$ (described in JP-A-62-108455 and JP-A-62-108457), a mixture of γ-β-$MnO_2$ and $Li_2MnO_3$ (U.S. Pat. No. 4,758,484), amorphous $V_2O_5$ (JP-A-61-200667), $V_6O_{13}$, $Li_xNi_yCO_{(1-y)}O_2$ ($0.05 \leq x \leq 1.10$, $0 \leq y \leq 1$) (JP-A-1-294372), $MoS_2$ (JP-A-61-64083), $TiS_2$ (JP-A-62-222578), polyaniline (JP-A-60-65031, JP-A-60-149628, JP-A-61-281128, JP-A-61-258831, JP-A-62-90878, JP-A-62-93868, JP-A-62-119231, JP-A-62-181334, and JP-A-63-46223), polyacetylene (JP-A-57-121168, JP-A-57-123659, JP-A-58-40781, JP-A-60-124370, JP-A-60-127669, and JP-A-61-285678), and polyphenylene.

In the electrode active materials, an electrically conductive material such as carbon, silver (JP-A-63-148554), or a poly(phenylene derivative) (JP-A-59-20971) and a binder such as Teflon may generally be incorporated.

Examples of the negative-electrode active material for use in the battery of the present invention include lithium metal, polyacene, polyacetylene, polyphenylene, carbon (JP-A-1-204361), calcium metal, sodium metal, aluminum, magnesium, zinc, niobium, and alloys of these metals, particularly lithium alloys. Examples of such lithium alloys include aluminum or magnesium alloys (JP-A-57-65670 and JP-A-57-98977), mercury alloys (JP-A-58-111265), Pt alloys (JP-A 60-79670), Sn-Ni alloys (JP-A-60-86759), Wood's metal alloys (JP-A-60-167279), electrically conductive polymer alloys (JP-A-60-262351), Pd-Cd-Bi alloys (JP-A-61-29069), Ga-In alloys (JP-A-61-66368), Pb-Mg alloys (JP-A-61-66370), Zn alloys (JP-A-61-68864), Al-Ag alloys (JP-A-61-74258), Cd-Sn alloys (JP-A-61-91864), Al-Ni alloys (JP-A-62-119865 and JP-A-62-119866), and Al-Mn alloys (U.S. Pat. No. 4,820,599). Of these, lithium metal, its alloys with Al, and carbon are useful.

In the separator employed in the battery of the present invention, the amount of the polymer grafted onto the polymer substrate is preferably 0.001 to 20 mg/$cm^2$, more preferably 0.01 to 10 mg/$cm^2$, and most preferably 0.1 to 5 mg/$cm^2$.

As described above, in producing the separator to be employed in the battery of the present invention, a polymer layer can be efficiently formed on the surfaces of a polymer substrate. The separator thus formed has advantages in that the polymer layer formed on the substrate never peels-off the substrate or dissolves away over a prolonged time period (or even when the separator is subjected to various treatments), and the separator retains its initial performance over a prolonged time period. Moreover, in producing the separator, the thickness of the polymer layer to be formed on a substrate can be controlled freely, from an extremely small to a large thickness, by suitably selecting polymerization conditions (temperature, time, monomer temperature, surfactant amount, etc.). A further advantage of the separator is that in the polymer layer-forming step, the substrate is less damaged as compared to the case of polymer film formation utilizing electron beams or the like and, hence, the properties originally possessed by the substrate are not substantially impaired.

Therefore, due to the use of the separator, the secondary battery of the present invention can show excellent charge-discharge cycle characteristics and is substantially free from internal short-circuiting and dendritic growth.

The present invention will be explained below in more detail with reference to the following examples, but the invention is not to be construed as being limited thereto. Unless otherwise indicated, all parts, percents, ratios and the like are by weight.

EXAMPLE 1

Plasma irradiation was conducted using plasma irradiator Model BP-1 manufactured by Samco International Kenkyusho as follows.

A porous polypropylene film (trade name, Julagard 2500; manufactured by Polyplastics Co., Ltd., Japan) having dimensions of 6 cm by 6 cm was placed on an electrode plate, and the pressure in the plasma irradiator was reduced to 0.675 Torr while nitrogen gas was continuously introduced therein at a rate of 30 ml/min. The polypropylene film was then irradiated with a plasma at an output of 50 W for 60 seconds. Subsequently, the pressure inside the irradiator was raised to ordinary pressure by introducing nitrogen gas, and the polypropylene film was then taken out from the irradiator. This plasma-treated polypropylene film was immersed in 200 g of an aqueous monomer solution which contained, as a monomer, 30 g of compound 1-2 as specified hereinabove and had been heated beforehand to 65° C. The monomer was then allowed to react at 65° C. for 3 hours. The polypropylene film was then taken out from the resulting monomer solution, subsequently washed with 1 liter of water for one day to remove the monomer which has been unreacted, and then dried. It was ascertained that a graft polymer had been formed on the resulting film in an amount of 2.2 mg per $cm^2$ of the film. Further, examination with an electron microscope revealed that the pores of the porous polypropylene film had been clogged.

This film was then immersed in a 1-mol/liter $LiBF_4$ solution in propylene carbonate/dimethoxyethane=1 (by volume). As a result, although the film swelled in the direction of thickness (dry film thickness 31 μm, after-immersion film thickness 58 μm), no swelling was observed in either of the length and width directions.

The film after immersion had an ionic conductance of $1 \times 10^{-3}$ S/cm.

Using this film as a separator, 100 batteries having a construction as illustrated in FIG. 1 were fabricated. In FIG. 1, numeral 1 denotes a positive-electrode active material, numeral 2 denotes a nonwoven fabric impregnated with an electrolyte solution, numeral 3 denotes a negative-electrode active material (lithium), numeral 4 denotes a stainless-steel case, numeral 5 denotes an insulating synthetic rubber, and numeral 6 denotes the separator. These batteries were subjected to a charge-discharge test in which charge and discharge were conducted between 1.5 V and 3.5 V at a constant current of 2 mA. No internal short-circuiting was observed.

Further, some of the batteries that had undergone 100 cycles of charge and discharge were charged and then disassembled, and the lithium surfaces were examined with an electron microscope. As a result, no dendritic growth was observed.

The positive electrode employed in each of the above-fabricated batteries had been prepared by mixing 90 parts by weight of $V_6O_{13}$ as a positive-electrode active material, 5 parts by Weight of Teflon as a binder, and 5 parts by weight of carbon black as an electrically conductive material to prepare a positive-electrode active material mixture, and then pressing the mixture into a pellet having a diameter of 1.3 cm. As the negative electrode, a lithium metal disk having a diameter of 1.3 cm was used which had been obtained by die-cutting.

EXAMPLES 2 TO 10

Polymer-grafted films were prepared in the same manner as in Example 1 except that the monomer, the output and time for plasma irradiation, and the temperature for polymerization were changed as shown in Table 1, and in the case of using a hydrophobic monomer, the following surfactant A was used for dispersing the monomer in an amount shown in Table 1.

Surfactant A:

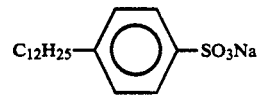

The grafted polymer amount and ionic conductance for each polymer-grafted film are shown in Table 1. In the same manner as in Example 1, batteries were fabricated using each of the films and were subjected to a charge-discharge test. No dendritic growth was observed in any of the batteries.

TABLE 1

| Example No. | Monomer compound No. (amount (g)) | Water (g) | Surfactant* (wt %) | Output (W) | Plasma irradiation time (sec) | Polymerization temperature (°C.) | Grafted polymer amount (mg/cm²) | Ionic conductance (S/cm) |
| --- | --- | --- | --- | --- | --- | --- | --- | --- |
| 1 | 1-2(30) | 170 | — | 50 | 60 | 65 | 2.2 | $1.0 \times 10^{-3}$ |
| 2 | 1-2(30) | 170 | — | 40 | 60 | 65 | 2.5 | $1.1 \times 10^{-3}$ |
| 3 | 1-6(25) | 175 | — | 40 | 60 | 65 | 3.1 | $1.2 \times 10^{-3}$ |
| 4 | 1-9(30) | 170 | 8 | 50 | 90 | 65 | 2.7 | $0.9 \times 10^{-3}$ |
| 5 | 1-11(30) | 170 | 10 | 40 | 60 | 65 | 2.6 | $1.0 \times 10^{-3}$ |
| 6 | 1-2(36), 2-3(4) | 160 | 10 | 50 | 90 | 60 | 2.1 | $1.0 \times 10^{-3}$ |
| 7 | 1-2(36), 2-7(4) | 160 | 10 | 50 | 60 | 65 | 2.0 | $1.0 \times 10^{-3}$ |
| 8 | 1-9(36), 2-8(4) | 160 | 10 | 50 | 60 | 65 | 2.3 | $0.9 \times 10^{-3}$ |
| 9 | 1-11(36), 2-6(4) | 160 | 10 | 50 | 60 | 65 | 3.0 | $1.0 \times 10^{-3}$ |
| 10 | 1-2(36), 2-3(2), 3-1(2) | 160 | 10 | 50 | 60 | 65 | 2.7 | $1.0 \times 10^{-3}$ |

*Based on the amount of monomer

COMPARATIVE EXAMPLE 1

One hundred batteries were fabricated in the same manner as in Example 1 except that untreated Julagard 2500 was used in place of the polymer-grafted film.

The batteries thus obtained were subjected to the same charge-discharge test as that in Example 1. As a result, two of the batteries suffered internal short-circuiting.

Further, some of the batteries that had undergone 100 cycles of charge and discharge were charged and then disassembled, and the lithium surfaces were examined with an electron microscope. Dendritic growth was observed.

COMPARATIVE EXAMPLE 2

A porous polypropylene film (Julagard 2500) having dimensions of 6 cm by 6 cm was irradiated with electron beams at a dose of 20 Mrad. This film was immersed in the same monomer solution as that used in Example 1, and polymerization and washing were then conducted in the same manner as in Example 1. As a result, a film onto which a polymer had been grafted in an amount of 5 mg/cm² was obtained. After being dried, this film was immersed in the same electrolyte solution as that used in Example 1. As a result, the film not only swelled in the direction of thickness (dry film thickness 32 μm, swelled film thickness 61 μm), but also swelled in the length and width directions by 10%.

COMPARATIVE EXAMPLE 3

30 parts by weight of compound 1-7 as specified hereinabove was mixed with 70 parts by weight of a 1-mol/liter LiBF₄ solution in propylene carbonate/di-methoxyethane=1/1 (by volume). Thereto was added 2,2-methoxy-2-phenylacetophenone as a photosehsitizer in an amount of 0.2% by weight based on the amount of the monomer. A polypropylene nonwoven fabric was immersed in the thus-prepared solution and then irradiated with ultraviolet rays for 10 minutes using a 200-W UV lamp, thereby polymerizing the monomer. Batteries were fabricated using the resulting film and subjected to a charge-discharge test in the same manner as in Example 1. The batteries that had undergone 100 cycles of charge and discharge were charged and then disassembled in an argon atmosphere, and the lithium surfaces were examined with an electron microscope. Dendritic growth was observed.

COMPARATIVE EXAMPLE 4

Graft polymerization was conducted in the same manner as in Example 1 except that 200 g of an aqueous solution containing 30 g of compound B (specified below) and 29 g of surfactant A used above was used as an aqueous monomer solution.

Compound B:

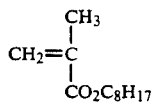

As a result, a film onto which a polymer had been grafted in an amount of 1.8 mg/cm² was obtained. This film had an ionic conductance of 3.0×10⁻⁵ S/cm. Batteries were fabricated using this film and subjected to a charge-discharge test in the same manner as in Example 1 except that a constant current of 0.1 mA was used. After the test, the lithium surfaces were examined and, as a result, dendritic growth was observed.

While the invention has been described in detail and with reference to specific embodiments thereof, it will be apparent to one skilled in the art that various changes and modifications can be made therein without departing from the spirit and scope thereof.

What is claimed is:

1. A secondary battery comprising a positive-electrode active material enabling the battery to discharge and to be charged, an electrolyte solution, a separator, and a negative-electrode active material enabling the battery to discharge and to be charged, wherein said separator is obtained by subjecting a porous polymer substrate to plasma treatment and polymerizing a monomer in the presence of the plasma-treated substrate thereby to graft-polymerize the monomer onto the substrate.

2. A secondary battery as claimed in claim 1, wherein said monomer contains a group capable of dissolving in the electrolyte solution.

3. A secondary battery as claimed in claim 1, wherein said monomer comprises at least one member selected from the group consisting of: a compound represented by the following general formula (1):

wherein $R_1$ represents a hydrogen atom or an alkyl group, $R_2$ represents $-C(O)-X_1-(CH_2CH_2O)_n-R_3$, $-C(O)-Y-(CH_2)_x-C_6H_5$, or $-CN$, in which $X_1$ and Y represent an oxygen atom or $-N(R_4)-$, with $R_4$ being a hydrogen atom or an alkyl group, n is an integer, $R_3$ represents a hydrogen atom, an alkyl group having from 1 to 3 carbon atoms, an aralkyl group, or an aryl group, and x is an integer; a compound represented by the following general formula (2):

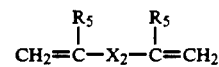

wherein $R_5$ represents a hydrogen atom or an alkyl group, $X_2$ represents $-C(O)-X_3-C(O)-$, in which $X_3$ represents $-O-X_4-O-$ or $-O-(CH_2CH_2O)_m-$, with $X_4$ being an alkylene group and m being 1 or more; and, a compound represented by the following general formula (3):

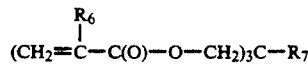

wherein $R_6$ represents a hydrogen atom or an alkyl group, $R_7$ represents an alkyl group or $-CH_2O-R_8$, in which $R_8$ represents a hydrogen atom or an alkyl group.

* * * * *